United States Patent
Kin et al.

(10) Patent No.: US 6,991,733 B2
(45) Date of Patent: Jan. 31, 2006

(54) PROCESS FOR REMOVING ORGANICS FROM ULTRAPURE WATER

(75) Inventors: Kon-Tsu Kin, Hsinchu (TW); Pei-Lin Chang, Hsinchu (TW); Farhang Shadman, Tucson, AZ (US); Hsiao-Fen Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 81 days.

(21) Appl. No.: 10/852,166

(22) Filed: May 25, 2004

(65) Prior Publication Data

US 2005/0263458 A1    Dec. 1, 2005

(51) Int. Cl.
  *B01D 19/00*   (2006.01)
  *C02F 1/04*    (2006.01)
(52) U.S. Cl. .............. 210/683; 210/691; 210/692; 210/900; 210/760; 210/748; 210/750; 210/664
(58) Field of Classification Search ............ 210/691, 210/692, 683, 900, 760, 748, 750, 664
See application file for complete search history.

(56) References Cited

U.S. PATENT DOCUMENTS

| | | | | |
|---|---|---|---|---|
| 4,595,498 A | * | 6/1986 | Cohen et al. ............ | 210/192 |
| 4,990,260 A | * | 2/1991 | Pisani .................... | 210/664 |
| 5,073,268 A | * | 12/1991 | Saito et al. ............. | 210/638 |
| 5,422,013 A | * | 6/1995 | Hirofuji ................. | 210/739 |
| 5,468,350 A | * | 11/1995 | Ban ........................ | 202/176 |
| 5,470,461 A | * | 11/1995 | Ban et al. ............... | 210/188 |
| 5,554,295 A | * | 9/1996 | Ban et al. ............... | 210/668 |
| 5,720,869 A | * | 2/1998 | Yamanaka et al. ...... | 210/638 |
| 6,713,771 B2 | * | 3/2004 | Nakagawa et al. ..... | 250/436 |
| 2001/0009155 A1 | * | 7/2001 | Matsuno et al. ........ | 134/2 |

* cited by examiner

*Primary Examiner*—Chester T. Barry
(74) *Attorney, Agent, or Firm*—Bacon & Thomas, PLLC

(57) ABSTRACT

In order to reduce a total organic carbon (TOC) in ultrapure water to a level less than 1 ppb, several cycles of ozone contact/UV irradiation treatments are carried out in sequence. Preferably, the first cycle further includes an ion exchange treatment which is applied to the resulting UV irradiation water.

13 Claims, 2 Drawing Sheets

PROCESS FOR REMOVING ORGANICS FROM ULTRAPURE WATER

FIELD OF THE INVENTION

The present invention is related to the purification for ultrapure water, particularly a method for further purifying ultrapure water having a total organic carbon (TOC) of several to 100 ppb to less than 1 ppb.

BACKGROUND OF THE INVENTION

Along with the development of nano-scale processes, e.g. nano electronics, nano materials, nanocarbon tubes, nano electric devices, and nano-scale analysis, the demand on the level of purity on ultrapure water and ultrapure gas will become more stringent. Taking the specification of ultrapure water as an example, a prediction on the trend of line width and water quality in nano electronic processes according to the International Technology Roadmap for Semiconductor (ITRS) stipulated by SEMATECH is listed in Table 1. The data listed in Table 1 show that the TOC, bacteria, fine particles, and ions contained in ultrapure water decrease along with a reduction in the process line width. Among which, the removal of organic matters (represented by TOC) in the purification of water is the most difficult to be overcome, because the removal of organic pollutants involves a conversion between two different phases, i.e. the pollutants can exist in a dissolved state or in a particle state. Meanwhile, the oxygen content and the metal content, etc. will influence the efficiency of organic pollutants removal. In a current ultrapure water system, major organic impurities removal units include a reverse osmosis unit and a TOC-UV unit. The ultrapure water system designed for a new process manufacturer, such as the 12-inch wafer manufacturer, mimics the design used in the 8-inch wafer manufacturer. Such a designed process mainly includes: a pre-treatment system including coagulation, sand filtration, a multiple filter, etc.; a primary treatment system including reverse osmosis, a vacuum degassing tower, an UV sterilizer, a mixed-bed deionization tower, a filter; and a polishing loop including a heat exchanger, an UV oxidizer, a polisher device, and an ultra-filter, etc. Said system includes only one loop, and the optimum TOC of the water generated can reach 1 ppb. Removal of the impurities in water mainly occurs in the pre-treatment and the primary treatment system stages. The polishing loop can further perform a minute removal on the remaining impurities in water mainly with the purpose of maintaining the quality of water. Since said systems according to the current technology can not further purify water, the present invention seeks a further development on a purifying system and method for further removal of minute organic matters in water.

TABLE 1

| Year | 2000 | 2003 | 2005 | 2006 | 2007 |
|---|---|---|---|---|---|
| Technical node | 180 nm | 130 nm | 100 nm | 70 nm | 65 nm |
| TOC (ppb) | 2 | <1 | <0.5 | <0.2 | <0.2 |

U.S. Pat. No. 6,579,445 B2 discloses a system for the production of ultrapure water having a specific resistance of at least 18.0 megohm.cm and a total organic carbon content of less than 1 ppb, that uses redox media, high energy catalytic activated carbon, ultraviolet radiation and high purity ion exchange media in series filtration. The system is designed to be fabricated on a sufficiently small scale to fit on a lab bench top.

U.S. patent published No. 2002/0134722A1 discloses an ultrapure water producing apparatus with reduced problems resulting from impurities generated after replacement of unit apparatuses. A TOC-UV, a CP and a UF membrane are provided in this order from the upstream side of a pure water supply route. Ultrapure water flowing through the UF film is supplied to a use point. A branch route branched from the pure water supply route is provided downstream of the UF film. A dissolved oxygen concentration meter is interposed in the branch route for measuring dissolved oxygen concentration in ultrapure water passed through the UF membrane. The branch route is connected to an oxidant decomposition unit. Oxidants included in ultrapure water flowing through the branch route are all converted into DO at the oxidant decomposition unit.

In a U.S. patent application Ser. No. 10/310,863, filed Dec. 6, 2002, the assignee of this application discloses a process and a system for processing waste water containing organic compounds, the disclosure of which is incorporated herein by reference. The system includes a UV/ozone oxidation removal module, or one or more removal modules connected in series whereas such a serial connection can be continuous or discontinuous. A UV/ozone oxidation module mainly includes an ozone generator, an ozone injector, an ozone dissolution tank, an ozone destructor, a UV reaction tank, a recycling pipeline. The efficiency of the UV/ozone oxidation removal module is controlled by the recycling ratio, the ozone concentration, and the intensity of UV light.

SUMMARY OF THE INVENTION

A primary objective of the present invention is to remove trace organic matters in ultrapure water in meeting demands on the TOC in water for a semiconductor manufacturing process in the future.

The present invention has developed a method for removal of trace amount of organic matters in ultrapure water generated by a current process by further subjecting the ultrapure water to a multi-loop treatments in series using ozone contact and UV irradiation in order to reduce the TOC in water to less than 1 ppb. Preferably, in the first cycle, UV-irradiated water is subjected to a further ion-exchange treatment. Optionally, each cycle can further includes a degassing treatment on the UV-irradiated water in order to remove the dissolved oxygen, $CO_2$ and volatile organic matters from water.

DETAILED DESCRIPTION OF THE INVENTION

The present invention discloses a method for removing trace amount of organic matters from ultrapure water, which comprises the following steps:

a) contacting ultrapure water containing less than 100 ppb of total organic carbon (TOC) with ozone, and irradiating the resulting ozone-containing water with an ultraviolet light (UV);

b) performing a degassing treatment on the ozone-containing and UV-irradiated water to remove the dissolved oxygen, carbon dioxide and volatile organic matters in therefrom;

c) contacting the degassed water from Step b) with an ion adsorption unit in order to reduce the TOC therein; and d) subjecting an effluent from the ion adsorption unit in Step c) to an ozone contact treatment and a UV irradiation treatment in sequence, until the TOC value in the resulting treated water is less than a specified value, preferably less than 1 ppb, more preferably less than 0.5 ppb, and most preferably less than 0.2 ppb.

Preferably, Step d) of the method of the present invention further comprises carrying out a degassing treatment and/or an ion adsorption treatment between the ozone contact treatment and the UV irradiation treatment. Preferably, said ion adsorption treatment is carried out by using an ion exchange resin. Said ion exchange resin may be a cationic ion exchange resin or an anion exchange resin. Alternatively, said ion adsorption treatment is carried out by using an electrolytic deionization device.

Preferably, said ion adsorption unit comprises an ion exchange resin.

Preferably, said ion adsorption unit comprises an electrolytic deionization device.

Preferably, said contacting ultrapure water with ozone in Step a) comprises mixing the ultrapure water with an ozone source gas to form an ozone-containing water with an ozone concentration of 10–1000 ppb.

Preferably, said degassing treatment comprises vacuuming and/or passing through a degassing membrane module.

Figure 1:
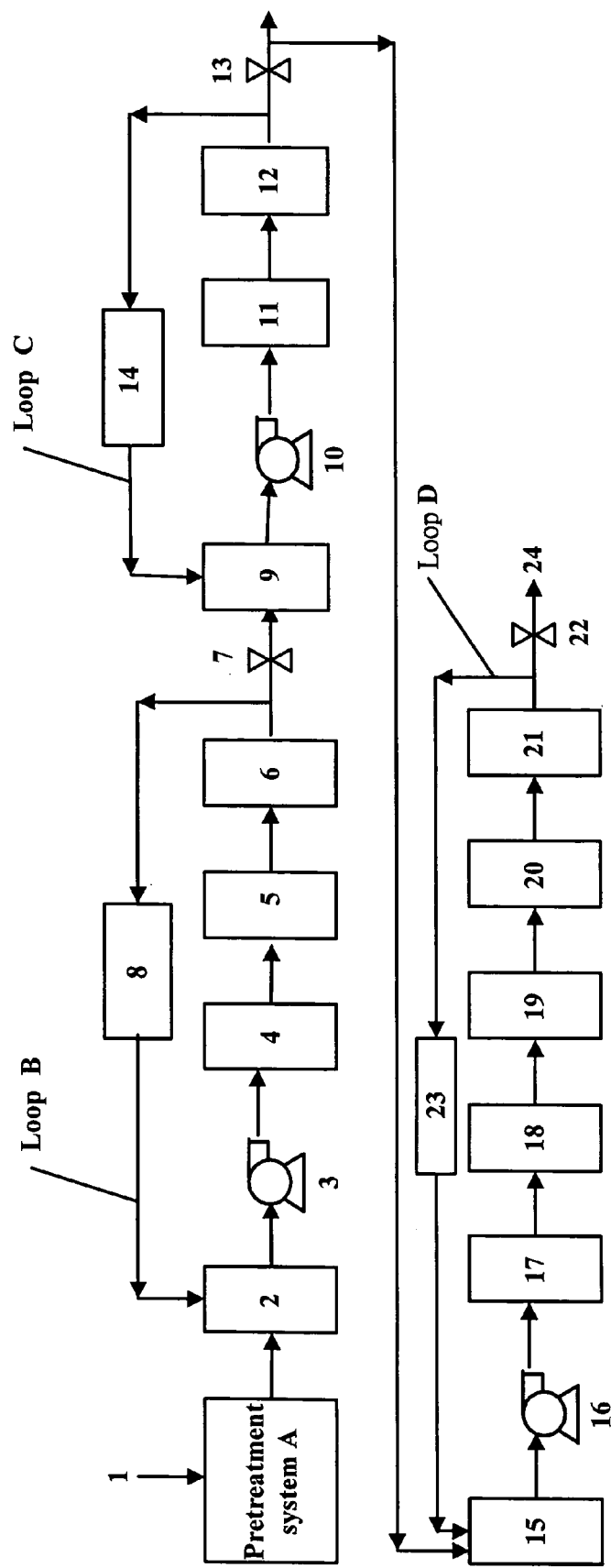
FIG. 1 is a schematic block diagram showing a system for removing minute amount of organic matters from ultrapure water according to a preferred embodiment of the present invention.

The present invention also discloses a system for further purifying ultrapure water, which comprises a pretreatment system A; an ultrapure water purification system with a loop B and a loop C; and optionally an auxiliary purification cycle D (as shown in FIG. 1).

An inlet water 1 (from tap water or a mixture water of tap water and recycled water from semiconductor manufacturing processes) is pre-treated by the pretreatment system A consisted of a softening unit, a sand filter or a multistage filter, an activated carbon absorption unit, a combination of a degassing tower and a strong alkaline/weak acid/strong acid-type ion exchange resin unit (generally 2-bed 3-tower or 3-bed 4-tower or 4-bed 5-tower, etc.), a pump, and a reverse osmosis membrane unit, etc. The pretreatment system A can effectively remove 95~99% of impurities, such as inorganic matters, fine particles, bacteria, and organic matters, etc., and enhance the efficiency of treatment in the subsequent purification units. Water treated by the pretreatment system A is stored in a storage tank 2 lined with a stable material (e.g. PVDF, PFA, Teflon, etc.) being anti-oxidative and having a low releasable of organic material dissolution. Said storage tank is sealed by nitrogen gas to prevent outside carbon dioxide and fine particles from entering. A pump 3 is used to pump water from the storage tank 2 to an ultraviolet oxidizer 4, wherein the ultraviolet lamp inside said UV oxidizer 4 is an ordinary low pressure mercury lamp, e.g. a low pressure mercury lamp with a wavelength of 185 nm–254 nm. Water, then, is stripped of dissolved oxygen, carbon dioxide, and volatile organic matters by a degassing unit 5. Next, the degassed water is introduced to flow through an electrolytic deionization unit or a mixed bed deionization unit 6 formed of a strong acid type cationic ion exchange resin and a strong alkaline type anionic ion exchange resin. A portion of the water treated by said unit 6 is introduced to an ozone generator 8 to form ultrapure water containing dissolved ozone, which is recycled to said storage tank 2 in order to be mixed with said pre-treated water, thereby forming the loop B. The mixed water in said storage tank 2 is purer than the discharged water from said pretreatment system A and has a lower TOC-concentration. When the mixed water passes said UV oxidizer 4, the dissolved ozone therein, upon receiving UV radiation, hydroxyl radicals having an extremely high activity are generated, which can remove organic matters more effectively and efficiently than individual UV oxidation or ozone oxidation. The recycling design can increase the retention time of ozone and increase the removal ratio of organic matters. The recycling ratio is controlled by a valve 7. The remaining portion of water is transported to a storage tank 9 lined with a stable material (e.g. PVDF, PFA, Teflon, etc.) being anti-oxidative and having a low releasable of organic material. Said storage tank 9 is sealed by nitrogen gas.

The processed water in the storage tank 9 was discharged via a pump 10 to a UV oxidizer 11, and then, optionally, to a purification component 12, which is a degassing unit, an ion exchange resin unit, or a combination thereof, or is omitted. Next, a portion of the effluent from the purification component 12 is recycled to an ozone generator 14 at a recycle ratio adjusted by a valve 13, the remaining portion thereof is fed to a storage tank 15 lined with a stable material (e.g. PVDF, PFA, Teflon, etc.) being anti-oxidative and having a low releasable of organic material. Said storage tank 15 is sealed by nitrogen gas. The abovementioned units/components 9 to 14 form the loop C. The loop C is identical to the loop B when the purification component 12 is a degassing unit and an ion exchange unit.

The processed water in the storage tank 15 is discharged to a heat exchanger 17 for temperature adjustment via a pump 16, then to an UV oxidizer 18, then to a mixed bed deionization unit 19, then to a degassing unit 20, and then to an ultrafiltration unit 21. A portion of the effluent from the ultrafiltration unit 21 is recycled to an ozone generator 23, and the remaining portion thereof is delivered to the point of use 24. The recycling ratio is adjusted by a valve 22. The steps 15 to 23 form the loop D. The main objective of the loop D is to further purify water by removing minute impurities therein, while maintaining the stability of ultrapure water quality.

Figure 2:
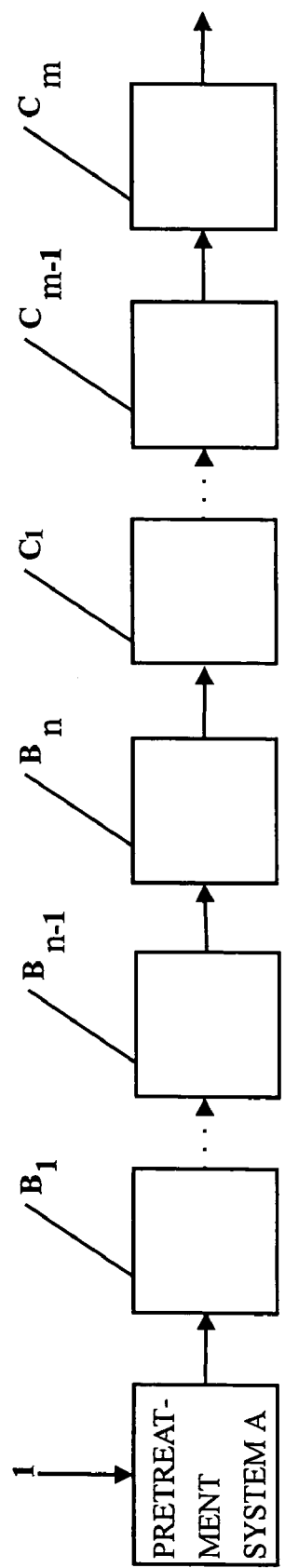
FIG. 2 is a schematic block diagram showing a system for removing minute amount of organic matters from ultrapure water according to another preferred embodiment of the present invention.

Another preferred embodiment of a system for removing trace organic matters from ultrapure water according to the present invention comprises, similar to the diagram shown in FIG. 1, said pretreatment system A, said loop B, said loop C, and optionally said loop D (not shown in FIG. 2), and additionally a plurality of serially connected cycles $B_1$–$B_n$ and a plurality of serially connected cycles $C_1$–$C_m$, wherein n and m are positive integers, and n+m>2.

The loop B and the loop C are designed according to the following examples.

EXAMPLE 1

A surfactant NCW commonly used in a semiconductor manufacturing process was continuously injected into a pipeline between a pump 3 and an UV oxidizer 4 shown in FIG. 1, so that 75 ppb of NCW was added. This example was carried out in a 100% recycle ratio where all treated water was completely recycled to the storage tank 2. After the UV irradiation, the TOC removal rate was about 8~10%. In this example, an additional ion exchange resin unit was added after the ion exchange resin unit 6. This cycle had two ion exchange resin units to verify the function of the ion exchange resin unit. After the first ion exchange resin unit, the TOC removal efficiency was about 46~54% with a stable TOC removal of 35~40 ppb; and after the second ion exchange resin unit, the TOC removal efficiency was only 8~12% with a TOC removal of 7.5~9.5 ppb. The above data indicate that organic matters are dissociated into ion states after UV oxidation, the first ion exchange resin unit has a high adsorption efficiency, and the second ion exchange resin unit has an adsorption efficiency significantly lower than that of the first unit. This indicates that adsorbable oxidation products are mostly adsorbed in the first ion exchange resin unit. After 60 minutes of observation, the amounts of adsorption by the first and second ion exchange resin units were stable. However, in this cycle, the TOC value measured upstream of the UV oxidizer 4 was increasing monotonically. This indicates that a portion of the oxidation products generated in the UV oxidizer 4 can not be adsorbed by the ion exchange resin units and accumulates in water. Next, the infusion of NCW was terminated, the TOC value decreased rapidly. After 140 minutes of circulation, the TOC reduced to 3.3 ppb. However, the amount of removal in the first and the second ion exchange resin units was nearly zero during the above interval. The removal of organic matters essentially was achieved by UV oxidation. Thus, in the first cycle design, only one ion exchange resin unit is installed downstream of the UV oxidizer such that all the adsorbable portion in the products resulting from UV oxidation is removed by ion exchange. Next, an advanced oxidation process (AOP) of UV treatment or UV/ozone treatment is used to remove the organic matters which can not be removed by ion exchange.

EXAMPLE 2

A surfactant NCW commonly used in a semiconductor manufacturing process was continuously injected into a pipeline between a pump 3 and an UV oxidizer 4 shown in FIG. 1, so that 10 ppb of NCW was injected. This example was carried out in a 100% recycle ratio where all treated water was completely recycled to the storage tank 2. After the UV irradiation, the TOC removal rate was about 18~20%. In this example, an additional ion exchange resin unit was added after the ion exchange resin unit 6. This cycle had two ion exchange resin units same as in Example 1. After the first ion exchange resin unit, the TOC removal efficiency was about 62% with a stable TOC removal of 6.2~6.6 ppb; and after the second ion exchange resin unit, the TOC removal efficiency was only 2.8~3% with a TOC removal of 0.3 ppb. The above data indicate that most of the organic matters dissociated into ion states after UV oxidation are adsorbed by the first ion exchange resin unit, i.e. the second ion exchange resin unit has an adsorption efficiency significantly lower than that of the first unit. After 25 minutes of observation, the amounts of adsorption by the first and second ion exchange resin units were stable. However, in this interval, the TOC value measured upstream of the UV oxidizer 4 was increasing monotonically. This indicates that a portion of the oxidation products generated in the UV oxidizer 4 can not be adsorbed by the ion exchange resin units and accumulates in water. Next, the infusion of NCW was terminated, the TOC value decreased rapidly. After 25 minutes of circulation, the TOC reduced to 2.1 ppb. However, the amount of removal in the first and the second ion exchange resin units was nearly zero during this interval. The removal of organic matters essentially was accomplished by UV oxidation.

What is claimed is:

1. A method for removing trace amount of organic matter from ultrapure water, which comprises the following steps:
   a) contacting ultrapure water containing less than 100 ppb of total organic carbon (TOC) with ozone, and irradiating the resulting ozone-containing water with an ultraviolet light (UV);
   b) performing a degassing treatment on the ozone-containing and UV-irradiated water to remove the dissolved oxygen, carbon dioxide and volatile organic matters in therefrom;
   c) contacting the degassed water from Step b) with an ion adsorption unit in order to reduce the TOC therein; and
   d) subjecting an effluent from the ion adsorption unit in Step c) to an ozone contact treatment and a UV irradiation treatment in sequence, until the TOC value in the resulting treated water is less than a specified value.

2. The method as claimed in claim 1, wherein said specified value is 1 ppb.

3. The method as claimed in claim 1, wherein said specified value is 0.5 ppb.

4. The method as claimed in claim 1, wherein said specified value is 0.2 ppb.

5. The method as claimed in claim 1, wherein Step d) further comprises carrying out a degassing treatment and/or an ion adsorption treatment between the ozone contact treatment and the UV irradiation treatment.

6. The method as claimed in claim 1, wherein said ion adsorption unit comprises an ion exchange resin.

7. The method as claimed in claim 5, wherein said ion adsorption treatment is carried out by using an ion exchange resin.

8. The method as claimed in claim 7, wherein said ion exchange resin comprises a cationic ion exchange resin or an anion exchange resin.

9. The method as claimed in claim 1, wherein said ion adsorption unit comprises an electrolytic deionization device.

10. The method as claimed in claim 5, wherein said ion adsorption treatment is carried out by using an electrolytic deionization device.

11. The method as claimed in claim 1, wherein said contacting ultrapure water with ozone in Step a) comprises mixing the ultrapure water with an ozone source gas to form an ozone-containing water with an ozone concentration of 10–1000 ppb.

12. The method as claimed in claim 1, wherein said degassing treatment comprises vacuuming and/or passing through a degassing membrane module.

13. The method as claimed in claim 5, wherein said degassing treatment comprises vacuuming and/or passing through a degassing membrane module.

* * * * *